Sept. 3, 1957
W. H. PRAHL
2,805,240
MANUFACTURE OF ARYL PHOSPHATES
Filed Oct. 29, 1953
2 Sheets-Sheet 1
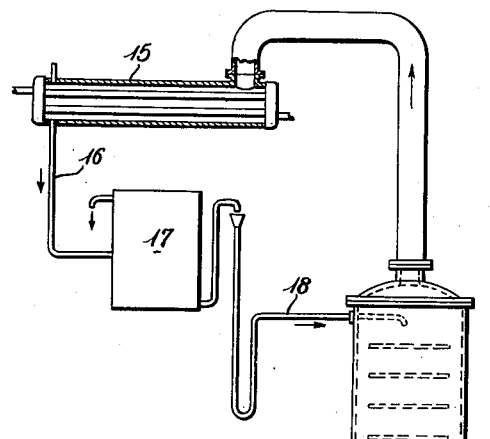
*Fig. 1.*
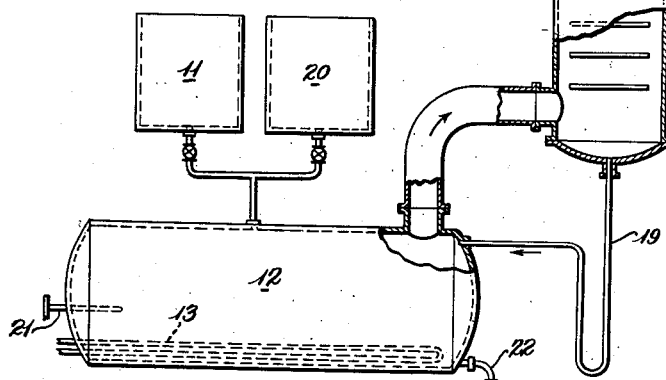
INVENTOR
*Walter H. Prahl*
BY R. C. Sugtune
ATTORNEY

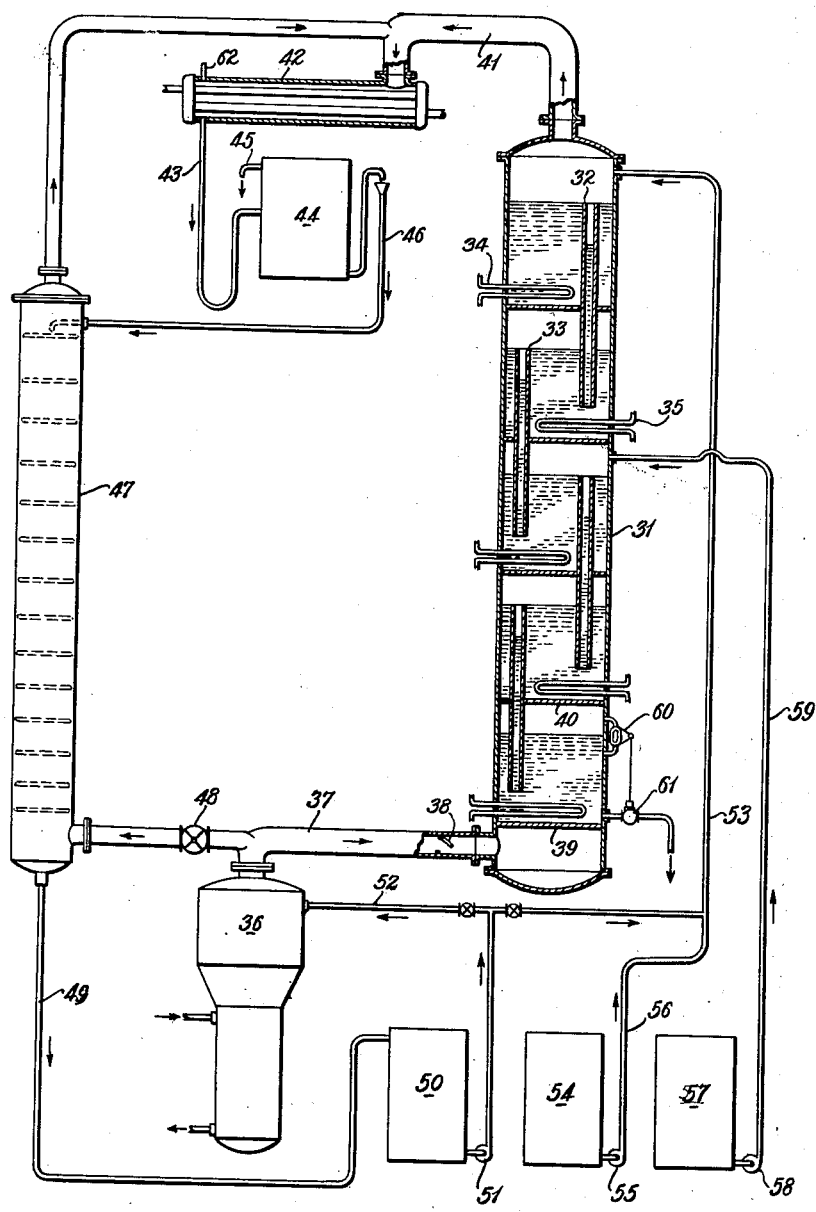

United States Patent Office 2,805,240
Patented Sept. 3, 1957

2,805,240

MANUFACTURE OF ARYL PHOSPHATES

Walter H. Prahl, Snyder, N. Y.

Application October 29, 1953, Serial No. 388,989

7 Claims. (Cl. 260—461)

This invention relates to the manufacture of aryl esters of phosphoric acid. More particularly, the present invention relates to a process and apparatus for the manufacture of tri-aryl esters of ortho-phosphoric acid, such as tricresyl phosphate, by a direct method of esterification.

By the term "direct method of esterification" is meant a method of esterification which reacts a hydroxy compound, such as an alcohol, with an acid and forms an ester as well as water as a byproduct. Theoretically this method as applied to the reaction between a hydroxyaryl compound, such as phenol, cresol, xylenol, etc., and ortho-phosphoric acid, would proceed in three steps, namely, the formation of the primary ester or mono-aryl phosphate, the formation of the secondary ester or di-aryl phosphate from the primary ester, and the formation of the tertiary ester or tri-aryl phosphate from the secondary ester. In reality, however, only the first two steps are easily carried out. Heating mixtures of phosphoric acid with phenol easily produces primary esters. Secondary esters are also formed under some conditions, but only small quantities of tertiary esters are formed. This is true even though the starting materials may be partially dehydrated substances, such as phosphorus pentoxide or aryl ethers.

Various reasons may be advanced as to why only small quantities of tertiary esters are formed when direct esterification methods are employed. It is known that the more acid groups an acid contains, the less liable it is to react. Ortho-phosphoric acid contains three acid groups. It is also known that tertiary alcohols react more sluggishly than secondary and especially primary alcohols. In so far as reactivity is concerned, phenols are analogous in their behavior to tertiary alcohols. It is further known that the closer the reactants are to each other in acidity, the less likely is the reaction to proceed. The phenols have a much higher degree of acidity than the alcohols, and the third hydrogen of phosphoric acid is notoriously weak, thus bringing the acidities of the phenols and phosphoric acid exceptionally close together.

The usual means of expediting an esterification reaction are ineffective in the case of esterifying hydroxyaryl compounds with phosphoric acid. Adding an acid as a catalyst is ineffective since phosphoric acid itsel fis a catalyst. The use of high temperatures is limited by the tendency of the lower esters to decompose under the influence of high temperatures. High temperatures also favor the formation of ethers, in which reaction the phosphoric acid acts as a catalyst. In the case of attempting esterification of alcohols with phosphoric acid, the alcohols would undergo dehydration and form unsaturated compounds, particularly if high temperatures were employed to expedite the reaction. In view of these many reasons, it is not surprising that prior attempts to directly esterify hydroxyaryl compounds with phosphoric acid to form tri-aryl phosphates have been unsuccessful.

The method described by Granger in U. S. Patent 1,869,312 of July 26, 1932, is the one attempt which came closest to producing tertiary aryl phosphates by a direct method of esterification. Granger heated a mixture of high boiling phenols and hydrocarbons derived from low temperature tar to its boiling point, added aqueous phosphoric acid, drove off water as an azeotrope with phenols and hydrocarbons, condensed the azeotrope separated the condensate into two layers, and returned the organic layer to the reaction mixture. The reaction proceeded to a stage at which the reaction mixture contained primary, secondary and some tertiary phosphate, and then ceased. Further attempts at continuing the reaction did not result in any additional progress.

The only method by which Granger was able to separate and recover the small quantities of tertiary esters from the large quantity of lower esters was by neutralization and extraction. This method obviously precluded further use of the lower esters as raw materials in the manufacture of additional quantities of tertiary esters. He concluded, in conformity with generally accepted practice, that the commercial manufacture of tri-aryl phosphates by direct esterification is economically not feasible and that the conventional chemical method, involving the use of phosphorus oxychloride, is preferable for the manufacture of these tertiary esters.

The chemical method, employing phosphorus oxychloride, has a number of disadvantages, such as the necessity of absorbing or otherwise disposing of the byproduct hydrogen chloride, corrosion problems caused by the presence of phosphorus oxychloride and hydrogen chloride, health and pollution problems created by the presence of these chemicals, and low yields owing to decomposition reactions induced or catalyzed by the hydrogen chloride as well as the metal chlorides formed in metal equipment. The most serious economic disadvantage is the inherently high price of phosphorus oxychloride as compared to the price of phosphoric acid, especially if the comparison is made on the basis of the available phosphorus content.

It is therefore obvious that, although numerous methods are known for the production of mixtures of mono- and di- with some tri-aryl phosphates, no method is known to convert these mono- and di-aryl esters by direct esterification to the tri-aryl ester by a technically practical method and in a commercially feasible yield. Accordingly it is the principal object of the present invention to produce tri-aryl phosphates by a direct method of esterification.

Another object of the present invention is to produce tri-aryl phosphates essentially without the formation of byproducts.

Another object of the present invention is to produce tri-aryl phosphates in the absence of chlorine compounds and the problems associated with their presence.

Another object of the present invention is to utilize phosphoric acid and especially dilute aqueous phosphoric acid, for the manufacture of tri-aryl phosphates.

Another object of the present invention is to provide apparatus for producing tri-aryl phosphates by the direct esterification method of the present invention.

These and other objects will become more apparent upon considering the following description of the present invention taken in conjunction with the drawings wherein:

Fig. 1 is a diagrammatic illustration of apparatus for producing tri-aryl phosphates batchwise in accordance with the present invention; and Fig. 2 is a diagrammatic illustration of apparatus for the continuous production of try-aryl phosphates in accordance with the present invention.

By the method of the present invention, di-aryl phosphates may be converted to tri-aryl phosphates by direct esterification. Since all methods of direct esterification utilize similar basic principles of operation, they bear considerable resemblance to each other and superficially the present invention is no exception. However, the following discussion will serve to explain how my contribution leads to the difference between success and failure in its application to commercial manufacture of tri-aryl phosphates and will at the same time point out why the art has been at a standstill because of a problem posed at least as early as 1928, the filing date of the Granger patent, and not solved until my discovery.

The failure of the attempt of the prior art to convert di-aryl esters of phosphoric acid to tri-aryl esters can be traced to one basic error. Theoretically there are two factors which determine the progress of an esterification reaction, namely the rate of esterification and the position of the equilibrium. If a reaction does not proceed at a satisfactory rate, the cause may be that it is either too close to the equilibrium point or that, although far from the equilibrium point, the chemical interaction is hindered by the chemical constitution of the reactants. The term "chemical constitution of the reactants" refers to the inherent resistance of the reactants to combine to form a desired reaction product. In the case of esterification this resistance may result in decomposition of the reactants or their reaction products or the formation of undesired by-products such as ethers or unsaturated compounds if severe conditions of operation are employed in an attempt to increase the rate of reaction.

In the case of normal esterification reactions by the direct method, as for example in the commercial esterification of alcohols by organic acids, the factor which is the more determinative of the rate of reaction is the chemical constitution of the reactants. Thus, in such esterification reactions, the equilibrium concentration of the water is high and its removal is no problem. In such esterifications, cases have been described in which the equilibrium, starting with an equi-molecular ratio of alcohol and acid, lies near 70 or 80 percent of ester, but in which it requires several hundred hours of forceful reaction to come near to the equilibrium. This is the result of the chemical constitution of the reactants rather than of the inabiliy to remove water formed in the reaction.

It was only natural to assume that the same factor prevailed in the esterification of phosphoric acid. This assumption is actually correct for the first two steps of the reaction, namely, the formation of the primary and secondary esters. I have discovered, however, that this assumption is not correct for the third step, the formation of tri-aryl phosphates from the di-aryl phosphates. Contrary to any analogy that may be drawn from other commercially satisfactory methods of direct esterification, the rate determining factor, under normal conditions of esterification, is not the chemical constitution of the reactants, but the rate at which the water is removed from the reaction mixture. This is because the equilibrium concentration of water in the reaction mixture is unbelievably low, on the order of 0.1%. Consequently, in accordance with my discovery, it is necessary to take extreme precautions for the removal of water from the reaction mixture which have not been necessary in other commercial esterifications.

The failure of the art to recognize this is best demonstrated by an analysis of the Granger method and the causes of its failure. Granger applied conventional methods of direct esterification to a mixture of phenols and hydrocarbons with phosphoric acid. In the initial stages of the reaction, copious quantities of water were driven over as the azeotrope and the formation of primary and secondary esters was easily brought about. However, the reaction came to a standstill when Granger attempted to form any appreciable quantities of the tertiary ester. Granger failed to realize that this standstill was not caused by the chemical constitution of the reactants but, instead, by the failure of the conventional method which he used to remove the water from the reaction mixture to a degree commensurate with the low equilibrium concentration of water in that mixture. During the course of his reaction the concentration of primary esters in the reaction mixture decreased, that of the secondary esters increased, and the concentration of water in the reaction mixture dropped rapidly. The concentration of water carried over with the phenol-hydrocarbon vapors decreased proportionately. The concentration of water dissolved in the phenol-hydrocarbon layer returning to the reaction, however, remained constant, this concentration being equal to the solubility of water in that layer. Soon a point was reached at which the quantity of water carried out with the vapors was equal to the quantity of water returned as solute in the organic layer. At this point no more water was removed from the reaction mixture and the reaction came to a standstill, not from any inherent disability to proceed because of the chemical constitution of the reactants but purely from failure to remove the water from the reaction mixture. Granger failed to recognize that the limit of the reactivity of a phosphoric acid-phenol esterification by conventional direct esterification procedure is established at the point at which the concentration of water in the vapors equals the solubility of water in the organic liquids returning to the reaction mixture. Thus, Granger is an example of the failure of the prior art to recognize the low limits of water concentration which this reaction can tolerate. Failure to appreciate this limiting factor was due to the fact that it was ingrained in the minds of the men skilled in this art that the barrier to the formation of tri-aryl phosphates by this method was the chemical constitution of the reactants.

The authority Kosolapoff (Organo-Phosphorus Compounds, John Wiley & Sons, Inc., 1950, p. 222) reacted to Granger's disclosure in the manner we would expect. Instead of pointing out that Granger's inability to carry out his reaction to commercial completion was caused by an erroneous assumption that the solubility of water in the organic layer was negligible as compared to the location of the equilibrium, Kosolapoff concluded with reference to Granger's method: "Although claims for formation of tertiary aromatic esters by such reaction have been made, it is difficult to visualize the realization of such a process." Granger himself, in his patent, conforms with this conclusion in respect to commercial yields.

The solution of the problem of converting di-aryl phosphates into tri-aryl phosphates by direct esterification according to the present invention is based on my discovery that in this reaction the equilibrium concentration of water in the reaction mixture is of the order of 0.1% or less, and that, in order to cause the reaction to proceed, the water content of the vapors emerging from the reaction mixture, since it corresponds to the water content of the mixture, must be correspondingly low and especially below the solubility of water in the hydroxyaryl compounds reacted with the di-aryl ester. In order to maintain these conditions it is necessary to control the water content of the liquid fed to the reaction mixture, in case of internal generation of the vapors, or of the vapors fed into the reaction mixture, in case of external generation of vapors, to a value substantially lower than the value of the solubility of water in the hydroxyaryl compound at room temperature.

This critical state of dryness can be achieved by any of the means known and used for drying of liquids or vapors, for example, absorption of water by a drying agent, such as calcium chloride, passing the material through silica gel, blowing dry air through it, etc. The preferred method, however, is to dry the liquid by passing its own vapors through it.

Although the water content of the vapors escaping from the reaction mixture, in which the esterification of di-aryl phosphates to try-aryl phosphates is carried on must be, in accordance with the present invention, below the solubility of water in the hydroxyaryl compound to be esterified, it is often preferable to control the water content of these vapors to a value considerably lower. In the formation of tri-cresyl phosphates, for example, from a mixture of meta and para cresol reacted with phosphorus pentoxide, the solubility of water in the hydroxyaryl compound amounts to approximately 13%. In the preferred method of operation the vapors were observed to contain approximately 5% water in the beginning, falling toward approximately 0.5% toward the end of the reaction.

The vapor pressure of water in a reaction mixture in which the lower steps of esterification, i. e., the formation of the primary ester from phosphoric acid and a hydroxyaryl compound and/or the formation of a secondary ester from the primary ester, takes place is considerably higher than the vapor pressure of water in the reaction mixture in which the final step of esterification to form a tertiary ester occurs. On account of this, vapors emerging from reaction mixtures in which the formation of the tertiary ester takes place according to the present invention may be utilized to remove water from such lower esterification reaction mixtures. This permits continuous production of tri-aryl phosphate from, for example, aqueous phosphoric acid and hydroxyaryl compounds by passing a mixture of phosphoric acid and hydroxyaryl compound down a column in countercurrent relation to a stream of hydroxyaryl vapors. In the lower portions of such a column the formation of tri-aryl phosphate takes place according to the present invention. In the upper portion of the column, the vapors from the lower compartment, having a relatively low water content, are utilized to promote the lower steps of the esterification by removing water.

As the concentration of di-aryl phosphate in the reaction mixture decreases with the increasing concentration of tri-aryl phosphate, the equilibrium concentration of water in the mixture, and proportionally the concentration of water in the vapors emerging from the mixture decreases. Consequently toward the end of the reaction when most of the phosphoric acid has been transformed to tri-aryl phosphate, the quantity of vapors required to remove a given quantity of water increases and may become so large as to make a continuation of the esterification uneconomical. At this point another advantage of the present invention over the method described by Granger becomes apparent. In Granger's method, the high concentration of primary and secondary phosphate in Granger's product caused decomposition of the reaction products when an attempt was made to separate them by vacuum distillation. In contrast to this, the end product obtained by the method of the present invention because of its low content of acidic substances, can be easily separated by vacuum distillation into its constituents. The hydroxyaryl compound and tri-aryl phosphate distill over while the lower esters, essentially the di-aryl phosphates, remain essentially undestroyed in the still. While Granger, in order to effect separation had to neutralize his end product and thus make the lower esters unfit for further esterification, the method of the present invention permits the recovery of the lower esters in a free, unneutralized form, ready to be subjected again to the present method of esterification by returning them into the next batch or feeding them to an appropriate point in the continuous esterification method. As a result of this advantage the phosphoric acid reactant may be converted almost quantitatively to tri-aryl phosphate.

As in the case of other esterification reactions, the rate at which these reactions proceed depends upon several factors. An important factor is the temperature, and it is necessary therefore to heat the liquid reaction mixture comprising a di-aryl ester of ortho-phosphoric acid and a hydroxyaryl compound to a temperature promoting the formation of a tri-aryl ester. In general, the higher the temperature, the faster is the rate of the reaction. The upper limit is determined by the stability of the hydroxyaryl compound being esterified. Low substituted phenols, such as the cresols, may be treated at temperatures well in excess of 300° C. without more than insignificant indications of decomposition such as the formation of phenol ethers and of tar and gases. In general the higher the substitution of the phenols the more sensitive they become, and in cases of phenols having for example 6 to 8 carbon atoms in the side chains, it is preferable to employ temperatures which do not exceed about 275° C. While the reaction rate decreases rapidly with decreasing temperature, it is difficult to state at what temperature it practically ceases. A measureable progress was observed in one experiment carried out between 115 and 125° C., but in general temperatures below about 170° C. require too much time to be economical. The preferred temperature range for the more common hydroxyaryl compound, such as the cresols, is about 240 to about 280° C., the lower end of this range being preferred in the beginning of the reaction and the higher end of this range being preferred during the later stages of the reaction.

The rate of reaction depends further on the nature of the hydroxyaryl compound. It appears that essentially two factors influence the reaction rate, namely, the acidity and the location of the substituent. Under otherwise equivalent conditions, the rate of esterification appears to be higher, the lower the acidity of the hydroxyaryl compound as indicated by its dissociation constant. Phenol has a lower rate of esterification than meta-cresol but a higher rate than para-chloro-phenol. Highly negative substituted phenols such as di-nitro-phenol have reaction rates so low as to make their commercial esterification economically questionable. The location of the substituents seems also to influence the reaction rate in so far as ortho-substituted phenols tend to react slower than meta- or para-substituted ones under otherwise equal conditions. This influence may possibly be explained by steric hindrance.

The foregoing factors are of primary importance in determining the economic conditions which dictate the extent of the yield at which tri-aryl phosphate reaction product should be recovered in accordance with the present invention. Yields as high as 99% may be obtained. However, it may often be desirable to recover the reaction product at a lower yield such as 50%. In any event, the yield obtained is high from the standpoint of the yield obtained by the method of Granger.

Specific examples of hydroxyaryl compounds which may be converted into tri-aryl phosphates in accordance with the present invention include phenol; ortho-, meta-, and para-cresol; any of the six xylenols; any of the six tri-methyl phenols; any of the three tetra-methyl phenols; penta-methyl phenol; substituted phenols such as the ethyl, isopropyl, n-propyl, n-butyl, sec.-butyl, tert.-butyl, amyl, etc. which correspond to the series of methyl substituted phenols set forth above; phenols substituted with halogen, nitro- and similar groups; etc. Since the three hydrogens of ortho-phosphoric acid react independently of each other, they may be substituted by reaction with the same or two different or three different hydroxyaryl compounds. For example, the reaction product of phosphoric acid with a mixture of the three cresols contains the following compounds: o,o,o-cresyl phosphate, o,o,m-cresyl phosphate, o,o,p-cresyl phosphate, o,m,m-cresyl phosphate, o,m,p-cresyl phosphate, o,p,p-cresyl phosphate, m,m,m-cresyl phosphate, m,m,p-cresyl phosphate, m,p,p-cresyl phosphate and p,p,p-cresyl phosphate.

In accordance with the present invention an essential reactant of the reaction mixture, namely, the diaryl phosphate, may be formed by any convenient method. For example, it may be obtained by reacting a hydroxyaryl compound with ortho-phosphoric acid as in the method of Granger. If desired it may, however, be formed by reacting phosphorus pentoxide with a hydroxyaryl compound or a mixture of hydroxyaryl compounds, Referring now to the drawings and more particularly to Figure 1, tank 11 contains a hydroxyaryl compound. The hydroxyaryl compound is fed to still 12 containing residue from a former operation and the mixture is brought to boiling by heat supplied by coils 13. The vapors pass through column 14 into condenser 15. The condensate flows through line 16 and into separator 17 filled from previous operations with its equilibrium mixture of the hydroxyaryl compound as the lower layer and water as the upper layer. The hydroxyaryl compound returns through line 18 to column 14 and from there through line 19 to the still 12. Tank 20 contains phosphoric acid. The phosphoric acid is gradually added to the content of the still so that the temperature indicated by thermometer 21 does not fall below a predetermined temperature. After all of the acid has been added, the temperature is permitted to rise. More of the hydroxyaryl compound is added from tank 11 so as to permit a gradual increase of the temperature in still 12 to the required temperature range. After the hydroxyaryl compound has been added, the reaction, although still slowly progressing, is preferably interrupted, and the content of still 12 is withdrawn through line 22 to a conventional vacuum fractionating still (not shown). Here it is separated into the hydroxyaryl compound which is returned to tank 11, the tri-aryl phosphate which after scrubbing with caustic is of commercial quality, and residue which is added to the next batch.

The purpose of returning the lower layer of separator 17 through the column 14 in countercurrent direction to the upwardly flowing hydroxyaryl vapors and then through line 19 to the reaction mixture is to remove the water present in the lower layer of hydroxyaryl compound and thereby provide substantially anhydrous hydroxyaryl liquid for the generation of hydroxyaryl vapors within still 12. The design of column 14 is such as to permit this. If the lower layer from separator 17 were returned directly to still 12, water would be introduced into the still at a rate greater than the rate at which water is removed therefrom by the hydroxyaryl vapors. As a result the extremely low equilibrium concentration of water in the reaction mixture would be exceeded and the reaction would come to a standstill as it did in the method of Granger.

Referring now to Figure 2, the reactor 31 consists of 5 compartments. The reaction mixture flows by gravity from the highest to the lowest compartment through overflow pipes such as 32 and 33. The contents of the compartment are kept heated by means of electric, "Dowtherm" or other heaters, such as 34 and 35. The temperature in the top compartment is the lowest with each succeeding lower compartment increasing in temperature. For example, when using cresol as the hydroxyaryl compound, the compartments are maintained at about 190° C., 210° C., 230° C., 250° C. and 270° C., respectively. Hydroxyaryl compound vapors are formed in vaporizer 36 by means of high pressure steam, "Dowtherm" or other heating means. The greater proportion of the vapors passes through line 37 and check valve 38 into the bottom of reactor 31 and is distributed through the perforations of sieve bottom 39 into the liquid content of the bottom compartment. After penetrating the liquid, the vapors are distributed through the next sieve bottom 40 into the content of the next compartment, and so on, moving countercurrent to the liquid through the reactor, picking up and entraining the water formed in the reaction, and finally passing through line 41 into condenser 42. The condensate flows through line 43 into separator 44 where the aqueous layer is withdrawn through line 45 and the hydroxyaryl compound layer passes through line 46 into drying column 47. The remainder of the vapors generated in vaporizer 36 is passed by control valve 48 into the bottom of liquid-vapor contact column 47 and drives the water out of the liquid hydroxyaryl compound flowing downwardly through the column. Column 47 is designed to obtain a sharpness of separation of water sufficient to meet the conditions of operation described above. The dry hydroxyaryl compound flows through line 49 into the hydroxyaryl compound tank 50 from which vaporizer 36 is fed by means of pump 51 and line 52. A small quantity of the hydroxyaryl compound is fed to the top of the reactor 31 by line 53. Phosphoric acid is pumped from supply tank 54 by pump 55 through lines 56 and 53 to the top compartment of the reactor 31. Residue from a source hereinafter described is pumped from tank 57 by pump 58 through line 59 to the middle compartment. The level of the lowest compartment is maintained, for example, by level control 60, permitting the reaction product to flow through valve 61 out to the separation unit (not shown). The separation unit consists preferably of a conventional continuous vacuum still, in which the reaction product is separated into hydroxyaryl compound which is returned to tank 50, tri-aryl phosphates, and residue, the latter being returned to tank 57. To avoid accumulation of impurities, a portion of the residue is withdrawn continuously or periodically and is separated preferably by extracting it with hot water into water soluble phosphates which are returned to tank 54 and water insoluble tarry residue.

As in the case of the Figure 1 modification, the organic layer in separator 44 containing hydroxyaryl compound with a water content equivalent to that soluble in the hydroxyaryl compound at the temperature of condensation is dried prior to return to the reaction mixture. This drying step permits the production of substantially anhydrous vapors in vaporizer 36 for the purpose of removing water from the reaction mixture at a rate at least substantially equal to the rate at which water is formed in the reaction mixture present in the lowest compartment.

Although a specific embodiment of apparatus for the continuous production of tri-aryl phosphates has been described, it should be understood that reactor 31 can be equipped with bubble plates instead of sieve bottoms; drying column 47 can be any conventional column, packed or equipped with plates, vaporizer 36 may be split into two evaporators, one attached to and supplying the reactor 31, the other attached to and supplying the drying column 47; vent 62 of the condenser may be connected to a source of vacuum to counteract the influence of the hydrostatic head in the reactor 40 upon the temperature of the hydroxyaryl compound boiling in 36, or vent 62 may be connected to a source of pressure so as to obtain higher reaction temperatures in reactor 40.

It is further within the purview of this invention that instead of starting with both components of the reaction being in their highest state of hydration, starting materials being in lower states of hydration such as meta-phosphoric acid, pyro-phosphoric acid and poly-phosphoric acids can be used; that instead of the phenols their ethers or esters such as mono- or di-aryl phosphates can be used.

It is further within the purview of this invention to control the reaction temperature by controlling the pressure. The reaction temperature depends essentially on the concentration of the hydroxyaryl compound in the mixture and on the pressure. Since the reaction rate is most favorable when the unreacted acid hydroxyls and the hydroxyaryl compound are present in approximately equivalent concentrations, it may be desirable to control the reaction temperature by controlling the pressure. In preparing tri-phenyl phosphates, e. g., it may be advisable to maintain a pressure of 20 pounds per square inch gauge, permitting a high concentration of phenol at reaction temperatures between 250° and 280° C., and in esterifying high boiling, heat sensitive phenols it may be advisable to lower the pressure to, e. g., 200 mm. Hg absolute pressure.

The following examples are for the purpose of illustrating the present invention but are not limiting to the scope thereof which is set forth in the claims.

Example I

Phosphorus pentoxide in the form of 72.3 gms. of commercial phosphorus pentoxide, containing 97% $P_2O_5$ was slowly added to 172.2 gms. of a commercial meta-para-cresol mixture, containing about 57% meta-cresol, 28% para-cresol and 5% other phenolic substances, in a beaker equipped with an efficient agitator and thermometer. The rate of addition was controlled so that the temperature did not exceed 100° C. and that no large lumps of undissolved phosphorus pentoxide were formed.

This solution contained mostly mono- and di-cresyl phosphates, with a trace of tri-cresyl phosphate. It was transferred to a 500 cc. roundbottom flask equipped with thermometer well and ground glass joint. The beaker was rinsed with 30.4 gms. of the above cresol mixture and the rinse added to the flask.

The flask was connected to a glass column of about 15 inches height and ¾ inch diameter, filled with ¼ inch porcelain rings. It was equipped, near the lower end, with a connection for a dripping funnel. The upper end was connected with a condenser and a liquid-separator, so arranged that the condensate flowed by gravity into the separator, from which the lower layer flowed by gravity back into the top of the column, acting as reflux. The lighter layer could be drawn off through a stopcock. A few pieces of Carborundum were dropped into the flask to facilitate boiling, and the content of the flask was heated by means of an electric heating mantle. The upper portion of the flask, the column and other exposed parts were heavily insulated.

The liquid in the flask started boiling at about 235° C. The temperature rose steadily, at the rate of about 1° per minute, and an aqueous layer began to separate in the separator. The progress of the reaction was best followed by the temperature rise and the water formation. After the temperature in the flask had reached 257°, it was lowered by dripping more of the cresol mixture above into it, and it was kept between about 250° C. and 270° C. by addition of cresol, first continuously and later, as the reaction slowed down, in batches of about 5 to 10 cc.

After the rate of temperature increase had slowed to approximately 1° C. in 10 minutes, the experiment was interrupted. A total of 164.0 gms. of cresol mixture had been added, and about 23 cc. of aqueous layer had separated. The flask with its content of 414.7 gms. was disconnected from the reaction column and connected to a small vacuum distilling column. Its content was separated, by distillation under approximately 3 mm. vacuum, into 90.4 gms. of a first fraction, the bulk of which distilled over near 88° C., consisting essentially of cresol with some tri-cresyl phosphate and traces of cresyl ethers, 260.0 gms. of a second fraction, the bulk of which distilled over near 255° C., consisting essentially of tri-cresyl phosphate, with some cresol in it, and a residue, weighing 63.1 gms. and consisting mostly of mono- and di-cresyl phosphate.

The residue was transferred to a 250 cc. flask, by means of 40.8 gms. of the first fraction serving as a rinse, and the flask was connected to the reaction column and boiled. The temperature in the flask was kept between about 250 and 270° C. by the gradual addition of 46.1 gms. more of the first fraction. After the rate of temperature increase had dropped to about 1° C. in 12 minutes, the reaction was interrupted. About 4 cc. of water had accumulated in the separator.

The flask, with its content of about 143.9 gms., was transferred to the distilling column and separated, as described above, into 41.6 gms. of cresol, 78.8 gms. of tri-cresyl phosphate, and 22.9 gms. of residue, consisting mostly of mono- and di-cresyl phosphate. From 72.3 gms. of 97% $P_2O_5$ (0.99 equivalent of P), 338.8 gms. of tri-cresyl phosphate (0.92 equivalent of P) had thus been produced. This yield of 92% could have been improved by further processing of the residue or by adding it to the next batch.

Example II

Phosphoric acid in the form of 122.5 gms. of commercial 85% phosphoric acid was diluted by 66.7 gms. of water, so that the resulting solution contained approximately 55% phosphoric acid. A total of 142.6 gms. of the cresol mixture defined in Example I were weighed into a 500 cc. flask which was then connected to the reaction still as described in Example I, and the mixture boiled. The aqueous solution of phosphoric acid was dropwise added to it from a dripping funnel at a rate so that the boiling temperature in the flask did not fall below 190° C. After all phosphoric acid had been added, the boiling was continued, and the temperature in the flask rose within about one hour to about 253° C. At that time, about 100 cc. water had been distilled over, indicating that the composition in the flask corresponded roughly to mono-cresyl phosphate. The boiling temperature was kept between about 250° and 280° C. by adding cresol as described in Example I. The experiment was interrupted after the rate of temperature increase had dropped to about 1° C. in 20 minutes. A total of about 241.2 gms. cresol had been added at that time, and about 133 cc. of water had separated. The content of the flask, about 437.3 gms., was distilled as described in Example I, and separated into 84.0 gms. of cresol containing some tri-cresyl phosphate and di-cresyl ether, 306.0 gms. of tri-cresyl phosphate, and 46.2 gms. of residue, consisting mostly of mono- and di-cresyl phosphate. From 104.0 gms. (1.06 equivalent P) of phosphoric acid in form of a dilute aqueous solution were thus obtained 306.0 gms. (0.832 equivalent P) of tri-cresyl phosphate, at a yield of 78.5%. Treating the residue again, as in Example I, or adding it to a new batch would have increased the over-all yield.

Example III

A total of 74.1 gms. of phosphorus pentoxide were dissolved in 151.0 gms. of phenol vigorously agitated in a beaker and cooled so as to keep the temperature below 100° C. The product was transferred into a 500 cc. flask, and the beaker was rinsed with 29 gms. of phenol. The flask was connected to the reaction still described in Example I, and brought to boiling. Starting at 235° C., the temperature in the flask rose within a few minutes to 250° C. and was kept there by adding continuously 45 gms. of phenol. Subsequently the temperature was permitted to rise gradually. It was kept during most of the time around 260° C. to 280° C. Toward the end of the reaction, the temperature was permitted to go to 290° C. to 300° C. The experiment was interrupted after 22 cc. of water had been collected in the separator. A total of 116 gms. of phenol had been added during the reaction, and the weight of the flask content was 347.5 gms. The flask was transferred to the distilling column and the content separated by distillation under approximately 10 mm. Hg into 53.5 gms. of phenol, the bulk of which distilled over at 78° C., 202.0 gms. of tri-phenyl phosphate, the bulk of which distilled over at about 230° C., and 91.4 gms. of residue. The freezing point of the tri-phenyl phosphate, after washing with 5% sodium hydroxide solution, was 44° C. The residue was almost completely soluble in hot water, and consisted mostly of mono- and di-phenyl phosphate.

Example IV

A total of 106.9 gms. of high boiling phenols containing side chains mostly in meta, meta' position, totaling about four carbon atoms, were placed into the reaction still described in Example I, and the vent of the system was connected with a vacuum pump and a manostate, to maintain a vacuum of approximately 22" mercury (approximately 190 mm. Hg absolute pressure). The high boiling phenols boiled under these conditions at a temperature of about 195° C. in the still. An 85% phosphoric acid solution was added dropwise from a dripping funnel to the high boiling phenols, and water began to collect in the separator. The mixture started foaming. To suppress it, more high boiling phenols were added, and the rate of boiling decreased. The addition of phosphoric acid was halted, after 97.6 gms. had been added. Shortly thereafter the foaming stopped and the reaction proceeded smoothly and with remarkable speed. The temperature rose rapidly from about 230° C. to about 250° C. It was kept between about 250° C. and 265° C. by further additions of high boiling phenols, first continuously, later in 10 cc. batches. When the rate of reaction, as indicated by the rise in temperature, had slowed down to about 5 minutes for 1° C., the experiment was halted. A total of 198.8 gms. of high boiling phenols had been added to the original charge, 54 cc. of water had been collected in the separator, and the flask contained 392.3 gms. of product.

Since the flask was too full for a smooth distillation, a portion of the product was taken out, leaving 214.5 gms. for fractionation. The fractionation was carried out under approximately 4 mm. of Hg at absolute pressure. The first fraction was taken from 106° C., to about 223° C., with the bulk distilling over at 109° C. The bulk of the second fraction distilled over between 255° C. and 263° C. The residue showed signs of decomposition at a temperature of 313° C. in the flask, and the distillation was halted, although the residue still contained obviously considerable quantities of high boiling phenol phosphate. The first fraction consisted of 57.9 gms. of mostly high boiling phenols while the second fraction weighing 84.0 gms. consisted of mostly tri-aryl prosphate. The residue weighed 74.1 gms.

A total of 50 cc. of the second fraction was agitated with 55 cc. of 10% sodium hydroxide solution, in order to extract the free phenols and other acid substances. A total of 43 cc. remained as a colorless, very viscous liquid which was opaque owing to the presence of suspended crystals.

The analysis showed it to contain: C 73.41%; H 7.43%; P 6.19%; O (by diff.), 12.97%. Calculated for $(C_{10}H_{13})_3PO_4$: C 72.83%; H 7.95%; P 6.27%; O (by diff.), 12.95%.

*Example V*

177.8 gms. of the reaction mixture obtained in Example IV was agitated first with 1000 ml. of a 10% sodium hydroxide solution kept at a temperature near 0° C. by adding ice, then with 200 ml. of a 5% sodium hydroxide solution and finally with water. The aqueous solution contained "high boiling phenols" and their mono- and di-phosphates. The tri-aryl phosphate remaining undissolved weighed 78.4 gms. It was identified by comparison with the product obtained in Example IV.

*Example VI*

From cresol tank 11, 150 lbs. of cresol are fed into the still 12. Residue of a former operation in the amount of 500 lbs. is also added and the mixture is brought to boiling by heating, e. g. with "Dowtherm" in coils 13. The vapors pass through column 14 into condenser 15. The condensate flows through line 16 into separator 17, filled from previous operations with its equilibrium mixture of cresol as the lower and water as the upper layer. The cresol returns through line 18 to column 14, and from there through line 19 to the still 12. Tank 20 contains 1000 lbs. of 75% aqueous phosphoric acid. The phosphoric acid is gradually added to the content of still 12, so that the temperature indicated by thermometer 21 does not fall much below about 190° C. After all the acid has been added, the temperature is permitted to rise to about 245° C. More cresol is added from tank 11, so as to permit a gradual increase of the temperature in still 12 to about 275° C. After about 1100 lbs. of cresol have been added, the reaction, although still slowly progressing, is preferably interrupted, and the content of still 12 is withdrawn through line 22 to a conventional vacuum fractionating still. Here it is separated into about 700 lbs. of cresol, which are returned to tank 11, about 2700 lbs. of water-white tricresyl phosphate, which after scrubbing with caustic, if necessary, is of commercial quality, and about 500 lbs. of residue.

I claim:

1. A process for producing a tri-aryl ester of orthophosphoric acid which comprises the steps of heating a liquid mixture comprising a di-aryl ester of ortho-phosphoric acid and a hydroxyaryl compound to a reaction temperature of from about 115° C. to about 300° C. removing water from the liquid reaction mixture by internally contacting the liquid reaction mixture with vapors of hydroxyaryl compound formed from substantially anhydrous hydroxyaryl compound, the water removal maintaining the water content of the reaction mixture below the equilibrium concentration of water in the reaction mixture, continuing said water removal to bring the proportion of water in the vapors emerging from the reaction mixture down to a value below 0.1% by weight, and recovering tri-aryl ester by means of distillation.

2. A process for producing a tri-aryl ester of orthophosphoric acid which comprises the steps of heating a liquid mixture comprising a di-aryl ester of ortho-phosphoric acid and a hydroxyaryl compound to a reaction temperature of from about 115° C. to about 300° C. removing water from the liquid reaction mixture by introducing, substantially anhydrous liquid hydroxyaryl compound into the reaction mixture to generate vapors of the hydroxyaryl compound under conditions such that water is entrained in the vapors, the water removal maintaining the water content of the reaction mixture below the equilibrium concentration of water in the reaction mixture, continuing said water removal to bring the proportion of water in the vapors emerging from the reaction mixture down to a value below 0.1% by weight, recovering reaction product after formation of a high yield of tri-aryl ester, and isolating the tri-aryl ester from the reaction product by fractional distillation under vacuum.

3. A process for producing a tri-aryl ester of orthophosphoric acid which comprises the steps of heating a liquid mixture comprising a di-aryl ester of ortho-phosphoric acid and a hydroxyaryl compound to a reaction temperature of from about 115° C. to about 300° C. removing water from the liquid reaction mixture by internally contacting the liquid reaction mixture with substantially anhydrous hydroxyaryl vapors generated externally of the liquid reaction mixture, the conditions of vapor contact being such that water is entrained in the vapors, the water removal maintaining the water content of the reaction mixture below the equilibrium concentration of water in the reaction mixture, continuing said water removal to bring the proportion of water in the vapors emerging from the reaction mixture down to a value below 0.1% by weight, and recovering the reaction product after the formation of a high yield of tri-aryl ester by means of distillation.

4. A process for producing a tri-aryl ester of orthophosphoric acid which comprises the steps of heating a liquid mixture comprising a di-aryl ester of ortho-phosphoric acid and a hydroxyaryl compound to a reaction temperature of from about 115° C. to about 300° C., promoting the formation of a tri-aryl ester and water, removing water from the liquid reaction mixture as the reaction proceeds to maintain the water content of the reaction mixture below the equilibrium concentration of water in the reaction mixture, continuing the removal of water to bring the proportion of water in the reaction mixture to below 0.1% by weight, and recovering a tri-aryl ester by means of distillation.

5. A process according to claim 4 in which the distillation is carried out under vacuum.

6. A process for producing a tri-aryl ester of ortho-phosphoric acid which comprises the steps of heating a liquid mixture comprising a di-aryl ester of ortho-phosphoric acid and hydroxyaryl compound to a reaction temperature of from about 115° C. to about 300° C., promoting the formation of a tri-aryl ester and water, removing water from the liquid reaction mixture as the reaction proceeds to maintain the water content of the reaction mixture below the equilibrium concentration of water in the reaction mixture, continuing the removal of water to bring the proportion of water in the reaction mixture to below 0.1% by weight, obtaining a reaction product and distilling said product to produce a distillate comprising tri-aryl ester and a separate residue comprising di-aryl ester of ortho-phosphoric acid, and utilizing said residue as make-up for the liquid reaction mixture in the further production of a tri-aryl ester of ortho-phosphoric acid.

7. A process according to claim 6 in which the distillation is carried out under vacuum.

References Cited in the file of this patent

UNITED STATES PATENTS 1,869,312    Granger _____ July 26, 1932

OTHER REFERENCES

Wertheim: Textbook of Organic Chemistry, 3rd ed., McGraw-Hill Book Co., Inc., New York (1951), pp. 232–233.